United States Patent [19]

Levine et al.

[11] 4,105,298

[45] Aug. 8, 1978

[54] ELECTRO-OPTIC DEVICES

[75] Inventors: Aaron William Levine, Lawrenceville; Grzegorz Kaganowicz, Princeton; Pabitra Datta, Cranbury, all of N.J.

[73] Assignee: RCA Corporation, New York, N.Y.

[21] Appl. No.: 786,401

[22] Filed: Apr. 11, 1977

[51] Int. Cl.² .................................................. G02F 1/13
[52] U.S. Cl. .............................................. 350/340; 428/1
[58] Field of Search ....................... 350/339, 340, 341; 428/1

[56] References Cited

U.S. PATENT DOCUMENTS

| 3,836,231 | 9/1974 | Cole, Jr. .................. | 350/340 |
|-----------|--------|------------------------------|---------|
| 3,864,021 | 2/1975 | Katagiri et al. ............. | 350/341 |
| 3,867,015 | 2/1975 | Sida et al. .................. | 350/340 |
| 3,910,682 | 10/1975 | Arai et al. .................. | 350/340 |
| 4,038,439 | 7/1977 | Gibson et al. ............... | 350/340 |

*Primary Examiner*—Edward S. Bauer
*Attorney, Agent, or Firm*—H. Christoffersen; Birgit E. Morris

[57] ABSTRACT

Improved perpendicular alignment can be imparted to nematic liquid crystal cells by coating the cell walls with a perfluorinated polymer applied to the cell walls by glow discharge in the presence of a perfluorinated monomer. The coated cell walls are thermally stable at least up to about 525° C.

14 Claims, 2 Drawing Figures

ELECTRO-OPTIC DEVICES

This invention relates to liquid crystal cells and a method of making them. More particularly, this invention relates to liquid crystal cells having improved visual contrast.

BACKGROUND OF THE INVENTION

Liquid crystal cells comprise a layer of liquid crystal material between two glass plates, at least one of which is transparent, which have a conductive layer or segments thereon to act as electrodes. In operation, the liquid crystal molecules, which are initially aligned in a certain direction with respect to the plates, respond to the presence of an electric field either by re-aligning themselves in a different direction, or by dynamic scattering. This change in alignment affects the passage of light through the cell and thus there is a change in contrast between the "on" and "off" states which can be employed in a display. By suitable patterning of the display, digital or other information can be made visible.

Certain types of liquid crystal molecules, those having negative dielectric anisotropy, generally employed for some types of cells such as dynamic scattering cells, deformation of aligned phase cells (DAP), reflective storage mode devices and the like, are most often aligned in the direction perpendicular to the glass plates which comprise the cell walls in the off state. Other liquid crystal molecules, having positive dielectric anisotropy and employed for example in twisted nematic field effect liquid crystal cells and guest-host cells, are normally aligned in a direction parallel to the cell walls. It will be apparent that any deviation from perfect off-state, initial alignment, either due to different angles of alignment or because of different angles between different molecules, will become manifest as visual defects in the cell or as a loss of contrast between the on and off states.

Various methods have been proposed heretofore to maximize the original perpendicular alignment of negative anisotropy liquid crystals.

Homeotropic aligning agents have been added directly to a liquid crystal composition, but this method has the disadvantage that the aligning agents are difficult to purify and the impurities adversely affect the lifetime of liquid crystal devices. Further, when filling a liquid crystal cell through a single fill port, a chromatography effect tends to concentrate the dopant around the fill port and the edges of electrode patterns, thereby giving rise to inhomogeneities in composition throughout the cell and thus to non-uniform alignment.

The cell walls have also been coated either with surfactants or with silane coatings such as dimethyl octadecyl-3-aminopropyl trimethoxysilyl chloride, which induces perpendicular alignment of the liquid crystal molecules with respect to the cell walls.

It has also been proposed to coat the electrode plates with thin layers of polymers produced by exposing the plates to a glow discharge in the presence of organic or organometallic compounds, including hexamethyl disiloxane, methyl methacrylate and isobutylene. The latter methods induce effective alignment, but they cannot withstand elevated temperatures, needed particularly for glass frit sealing of liquid crystal cells. Glass frit sealing requires temperatures of over 500° C, usually about 525° C, in order to form a hermetic seal between the electrode plates.

Thus a method of aligning liquid crystal molecules perpendicular to the electrode plates which will withstand a frit sealing step would be highly desirable.

SUMMARY OF THE INVENTION

We have found that a polymeric film produced by exposing conductively coated glass plates to a glow discharge in an atmosphere containing cyclic perfluorinated monomers induces perpendicular alignment to both negative and positive dielectric anisotropy liquid crystal molecules. The polymeric films are highly temperature stable.

DETAILED DESCRIPTION OF THE INVENTION

Cyclic perfluorinated monomers suitable for use in the present invention are compounds having a weak C—C bond linkage but a stronger C—F bond linkage which are readily cleaved through the C—C bond in the presence of a glow discharge. Such compounds include perfluorinated cycloalkanes such as perfluorocyclobutane, perfluorocyclopentane, perfluorocyclohexane and the like, and cycloolefines such as perfluorocyclohexene, and the like; perfluoroalkyl-substituted derivatives of the above compounds are also eminently suitable.

When the vaporized monomer is introduced into a vacuum chamber and a glow discharge is established, a perfluorinated polymer film of unknown structure is obtained that has a high stability to heat, atmospheric oxygen, water and the like and has a very low surface energy.

The polymers can be formed in a vacuum chamber fitted conventionally for glow discharge polymerization of a monomer.

Figure 1:
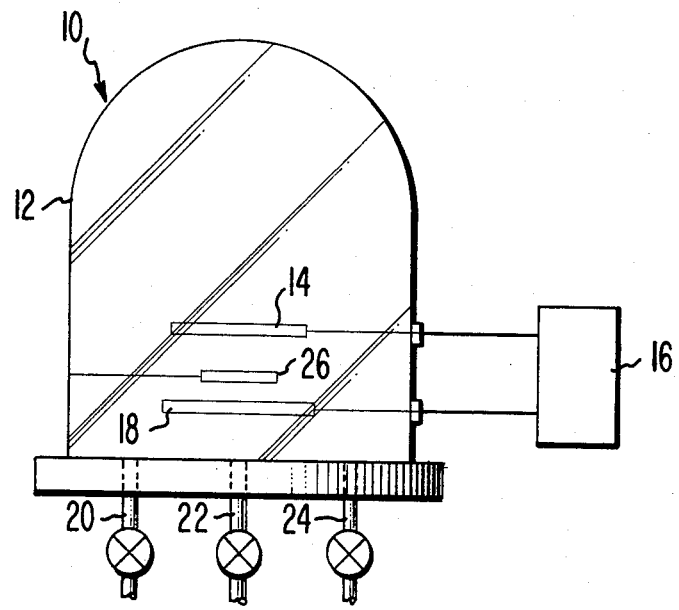
FIG. 1 is a cross sectional view of a glow discharge apparatus.

A glow discharge apparatus suitable for carrying out the coating is shown in FIG. 1, generally as 10. The glow discharge apparatus 10 includes a vacuum chamber 12, such as a glass bell jar. In the vacuum chamber 12 is an electrode 14, which can be a screen or coil of a metallic material which is a good electrical conductor, such as platinum. The electrode 14 is connected to the positive terminal of an external power source 16. An electrode 18 is spaced from and is opposite the electrode 14 and can be a stainless steel plate which is connected to the negative terminal of the power source 16. The power source 16 may be DC or AC. Thus there will be a voltage potential between the electrode 14 and the electrode 18.

A first outlet 20 into the vacuum chamber 10 allows for evacuation of the system and is connected to a mechanical pump. Second and third outlets 22 and 24, respectively, are connected to gas bleed systems for adding gases employed in the coating process.

In carrying out the coating process, the substrate 26 to be coated is placed between the electrodes 14 and 18, typically maintained about 5–10 cm apart. The vacuum chamber 12 is then evacuated through first outlet 20 to a pressure of about $0.5 - 1 \times 10^{-6}$ torr. An inert gas, such as nitrogen or argon, may be added to the second outlet 22 to a partial pressure of about 10–15 mtorr. The monomer is added through the third outlet 24 to a partial pressure of about 20–45 mtorr.

A glow discharge is initiated between the electrodes 14 and 18 by energizing the power source 16, when deposition of a polymer on the substrate 26 will begin. For deposition the current density should be in the range of 1–5 ma/cm$^2$ using 500–1000 volts. Under these conditions, the polymers will be deposited at the rate of about 2–15 angstroms per second.

For coating liquid crystal cell walls, the substrate 26 will be glass plates coated with a transparent, conductive film such as indium-doped tin oxide coated glass.

When assembled to form a liquid crystal cell, the glass plates coated in accordance with the above described method align liquid crystal molecules, whether of positive dielectric anisotropy or of negative dielectric anisotropy, in a direction perpendicular to the glass plates. The effects of the coating that are due to the low surface energy perfluorinated polymer are obtained even after the coated plates have been exposed to high temperatures of 500°–525° C which are required for a glass frit seal between the coated glass plates.

Figure 2:
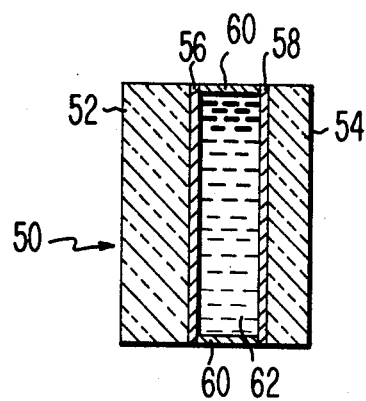
FIG. 2 is a cross sectional view of an electrooptic liquid crystal device.

FIG. 2 is a cross sectional view of a simple liquid crystal cell 50. Glass plates 52 and 54 having a thin coating of a transparent conductive layer 56 and 58, as of tin oxide, thereon are joined with a glass frit seal 60 and enclose a thin layer of a liquid crystal composition 62.

The invention will be further illustrated by the following Examples but it is meant to be understood that the invention will not be limited to the details described therein. In the Examples, percentages are by weight. All pressure measurements were made using a Pirani gauge.

EXAMPLE 1

Commercially available glass plates coated with indium-doped tin oxide were etched to remove the coating from one-half of the plates. The plates were mounted in a vacuum chamber as in FIG. 1 between two electrodes maintained 5 cm apart. The electrodes were operated at 10 KHz and a current density of 1–5 ma/cm$^2$ at about 1000 volts. The chamber was evacuated to a pressure of $1 \times 10^{-6}$ torr and backfilled with nitrogen to a pressure of 10 mtorr. The monomer perfluoro-1,3-dimethylcyclohexane was added to a pressure of 30 mtorr.

Polymer deposition was started by energizing the electrodes and was continued until a polymer layer about 500 angstroms thick was deposited.

The surface energy of the polymer film on the plates was determined by measuring the contact angle of drops of a variety of solvents whose surface tension is known. The critical surface tension ($\gamma c$) was 18 dynes/cm. The dispersive contribution ($\gamma_s^d$) was 20.3 dynes/cm. The polar contribution ($\gamma_s^p$) was 0.08 dynes/cm.

Liquid crystal cells were assembled from the above plates using 12.5 micron thick teflon spacers. The cells were filled with various nematic liquid crystal comcompounds and compositions: p-methoxybenzylidene-p'-butylaniline (MBBA); an equimolar mixture of MBBA and p-ethoxybenzylidene-p'-butylaniline (EBBA) also known as EM; a mixture of 90% of EM and 10% of p-butoxybenzylidene-p'-cyanoaniline (BBCA); and a mixture of 80% of MBBA and 20% of BBCA. The first two compositions have negative dielectric anisotropy and the latter two have positive dielectric anisotropy.

All of the liquid crystal molecules were aligned perpendicular with respect to the plates as viewed through crossed polarizers and were equivalent in all respects to the best known perpendicular alignment obtainable by other methods.

Several additional coated plates were exposed to a baking cycle equivalent to that used when glass plates are assembled to form frit-sealed cells. This entailed heating to 525° C. After cooling, cells were prepared from the plates in the manner described above. The cells were filled with MBBA containing about 0.1% of tetraheptylammonium tetraphenylboride as an ionic dopant. The perpendicular alignment of the liquid crystal molecules was as good as above and in all respects the cell was at least equivalent in its electro-optic properties with commercial dynamic scattering liquid crystal cells.

EXAMPLE 2

Following the procedure of Example 1, a polymer film of perfluorocyclohexene was applied to the glass plates. The critical surface energy ($\gamma c$) was 22–24; $\gamma_s^d$ was 29 and $\gamma_s^p$ was 0.3 Liquid crystal cells 0.5 mil (12.7 microns) in thickness were assembled from these plates and filled with several nematic liquid crystal mixtures; MBBA; a mixture of 80% of MBBA and 20% of BBCA and EM + 10% of BBCA.

All of the liquid crystal molecules were aligned perpendicular with respect to the plates.

EXAMPLE 3

Following the procedure of Example 1, a polymer film derived from an isomeric mixture of perfluorodimethyl cyclobutanes was applied to the glass plates. The critical surface energy ($\gamma c$) was 20–22; $\gamma_s^d$ was 26; $\gamma_s^p$ was 0.7.

Liquid crystal cells were assembled from these plates and filled with the liquid crystal mixtures of Example 2. All of the liquid crystal molecules were aligned perpendicular with respect to the plates.

We claim:

1. In an electro-optic device comprising a liquid crystal composition between two electrodes, the improvement which comprises coating each of said electrodes with a perfluorinated polymer film formed from a cyclic perfluorinated monomer by glow discharge.

2. A device according to claim 1 wherein said film is from 50–1000 angstroms thick.

3. A device according to claim 1 wherein said liquid crystal composition has negative dielectric anisotropy.

4. A device according to claim 1 wherein said liquid crystal composition is a dynamic scattering liquid crystal.

5. A device according to claim 1 wherein said electrodes comprise glass plates coated with transparent, electrically conductive electrodes.

6. A device according to claim 1 wherein said perfluorinated polymer is derived from a member of the group consisting of perfluorocycloalkanes, perfluorocycloolefins, and perfluoroalkyl-substituted derivatives thereof.

7. A device according to claim 6 wherein said polymer is formed from perfluoro-1,3-dimethylcyclohexane.

8. A device according to claim 6 wherein said polymer is formed from perfluorocyclohexene.

9. A device according to claim 6 wherein said polymer is formed from perfluorodimethylcyclobutane.

10. A method of improving the perpendicular alignment of liquid crystals in liquid crystal cells comprising a liquid crystal composition between two electrodes which comprises coating said electrodes with a perfluorinated polymer film formed from a cyclic perfluorinated monomer by glow discharge.

11. A method according to claim 10 wherein said polymer is derived from perfluorocycloalkanes, perfluorocycloolefines and perfluoroalkyl-substituted derivatives thereof.

12. A method according to claim 10 wherein said polymer is formed from perfluoro-1,3-dimethylcyclohexane.

13. A method according to claim 10 wherein said polymer is formed from perfluorocyclohexene.

14. A method according to claim 10 wherein said polymer is formed from perfluorodimethylcyclobutane.

* * * * *